US009731560B2

(12) United States Patent
Takano

(10) Patent No.: US 9,731,560 B2
(45) Date of Patent: Aug. 15, 2017

(54) PNEUMATIC TIRE

(71) Applicant: Sumitomo Rubber Industries, Ltd., Kobe-shi, Hyogo (JP)

(72) Inventor: Hirokazu Takano, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 413 days.

(21) Appl. No.: 14/225,485

(22) Filed: Mar. 26, 2014

(65) Prior Publication Data

US 2014/0338804 A1 Nov. 20, 2014

(30) Foreign Application Priority Data

May 15, 2013 (JP) .................................. 2013-103339

(51) Int. Cl.
*B60C 11/13* (2006.01)
*B60C 11/03* (2006.01)

(52) U.S. Cl.
CPC .......... *B60C 11/13* (2013.01); *B60C 11/0309* (2013.04); *B60C 11/1307* (2013.04);
(Continued)

(58) Field of Classification Search
CPC . B60C 11/13; B60C 11/1307; B60C 11/1323; B60C 11/1392; B60C 11/0309; B60C 11/042; B60C 2011/0369; B60C 2011/0358; B60C 2011/0365; B60C 2011/0367; B60C 2011/0372
See application file for complete search history.

(56) References Cited

U.S. PATENT DOCUMENTS

| 5,957,180 A | * | 9/1999 | Kuramochi | ............. B60C 11/12 |
|---|---|---|---|---|
| | | | | 152/209.21 |
| D666,555 S | * | 9/2012 | Takano | ........................ D12/585 |
| 2012/0111466 A1 | * | 5/2012 | Takano | ............... B60C 11/0302 |
| | | | | 152/209.9 |

FOREIGN PATENT DOCUMENTS

| EP | 0 393 873 A2 | 10/1990 |
|---|---|---|
| EP | 0825039 A1 | 2/1998 |

(Continued)

OTHER PUBLICATIONS

Machine translation of JP11-180116 (no date).*
(Continued)

*Primary Examiner* — Michael H Wilson
*Assistant Examiner* — Philip N Schwartz
(74) *Attorney, Agent, or Firm* — Birch, Stewart, Kolasch & Birch, LLP

(57) ABSTRACT

A pneumatic tire includes a tread portion provided with at least one circumferentially extending main groove, and at least one lateral groove extending from the main groove. The at least one lateral groove comprises a bottom, and at least one stepwise groove wall that includes at least one level part, wherein the number of level part is not more than three. In a cross-sectional view of the lateral groove, a depth Da from a ground contacting surface of the tread portion to a radially innermost level part is in a range of from 50% to 80% a maximum groove depth D4 of the lateral groove, and a width Wa from the radially innermost level part to a groove edge of the stepwise groove wall measured along in a groove width direction is in a range of from 50% to 150% the depth Da.

5 Claims, 7 Drawing Sheets

(52) U.S. Cl.
CPC ...... *B60C 11/1323* (2013.04); *B60C 11/1392* (2013.04); *B60C 2011/0358* (2013.04); *B60C 2011/0365* (2013.04); *B60C 2011/0367* (2013.04); *B60C 2011/0369* (2013.04); *B60C 2011/0372* (2013.04)

(56) References Cited

FOREIGN PATENT DOCUMENTS

| | | | | |
|---|---|---|---|---|
| EP | 2050589 A1 | 4/2009 | | |
| JP | 50-098002 | * 8/1975 | ............ | 11/4 |
| JP | 2-283507 A | 11/1990 | | |
| JP | 11180116 A | * 7/1999 | ............ | B60C 11/12 |

OTHER PUBLICATIONS

Human Translation of JP50-098002 (Translation performed Apr. 2016).*

Extended European Search Report dated Oct. 16, 2014 for European Application No. 14160978.4.

* cited by examiner

PNEUMATIC TIRE

BACKGROUND OF THE INVENTION

Field of the Invention

The present invention relates to a pneumatic tire that may exhibit excellent noise performance and better traction on snow.

Description of the Related Art

Japanese Patent Unexamined Application Publication 02-283507 discloses a pneumatic tire that comprises a tread portion provided with a plurality of tread blocks separated by circumferentially and continuously extending main grooves and a plurality of lateral grooves. Such a pneumatic tire having a plurality of tread blocks may enhance traction on snowy roads by shearing compressed snow in the lateral grooves. These days, the lateral grooves of tires tend to be designed to have a larger groove volume to further enhance traction on snow.

The tire having lateral grooves with a larger groove volume, however, tends to generate large air-pumping noise during traveling because the air is trapped and compressed in the lateral grooves between the tread portion and pavement. Furthermore, pipe resonance noise generated in the main grooves during traveling tends to leak outside of the tire through the lateral groove with a larger groove volume.

SUMMARY OF THE INVENTION

The present invention has been worked out in the light of the circumstances described above, and has a main object of providing a pneumatic tire may exhibit excellent noise performance and better traction on snow.

According to one aspect of the invention, a pneumatic tire includes a tread portion provided with at least one circumferentially and continuously extending main groove, and at least one lateral groove extending from the main groove, the at least one lateral groove comprising a bottom, and at least one stepwise groove wall that includes at least one level part, wherein the number of level part is not more than three, and in a cross-sectional view of the lateral groove, a depth Da from a ground contacting surface of the tread portion to a radially innermost level part being in a range of from 50% to 80% in relation to a maximum groove depth D4 of the lateral groove, and a width Wa from the radially innermost level part to a groove edge of the stepwise groove wall measured along in a groove width direction being in a range of from 50% to 150% in relation to the depth Da.

According to another aspect of the invention, the at least one main groove may include a shoulder main groove arranged in a nearest side of a tread edge, the at least one lateral groove may include a shoulder lateral groove that extends axially outward from the shoulder main groove, and a middle lateral groove that extends axially inward from the shoulder main groove, and the stepwise groove wall may be provided on the shoulder lateral groove or the middle lateral groove.

According to another aspect of the invention, the middle lateral groove may be inclined at an angle in a range of from 15 to 60 degrees with respect to an axial direction of the tire, and the shoulder lateral groove may be inclined at an angle smaller than that of the middle lateral groove with respect to the axial direction of the tire, wherein the angle of the shoulder groove may be in a range of from 5 to 45 degrees.

According to another aspect of the invention, the shoulder main groove may extend in a zigzag manner having an axial amplitude between its axially innermost peak and its axially outermost peak. The middle lateral groove may be communicated with the axially innermost peak of the shoulder groove. The middle lateral groove may comprise a first groove wall having a first groove edge, and a second groove wall having a second groove edge, wherein the first groove wall is formed as the stepwise groove wall, and the second groove wall is formed as a non-stepwise groove wall. The second groove edge may be smoothly connected to an axially inner groove edge of the shoulder main groove, and the first groove edge may be connected to the shoulder main groove at a place axially outside of the axially innermost peak.

DETAILED DESCRIPTION

An embodiment of the present invention will be explained below with reference to the accompanying drawings.

Figure 1:
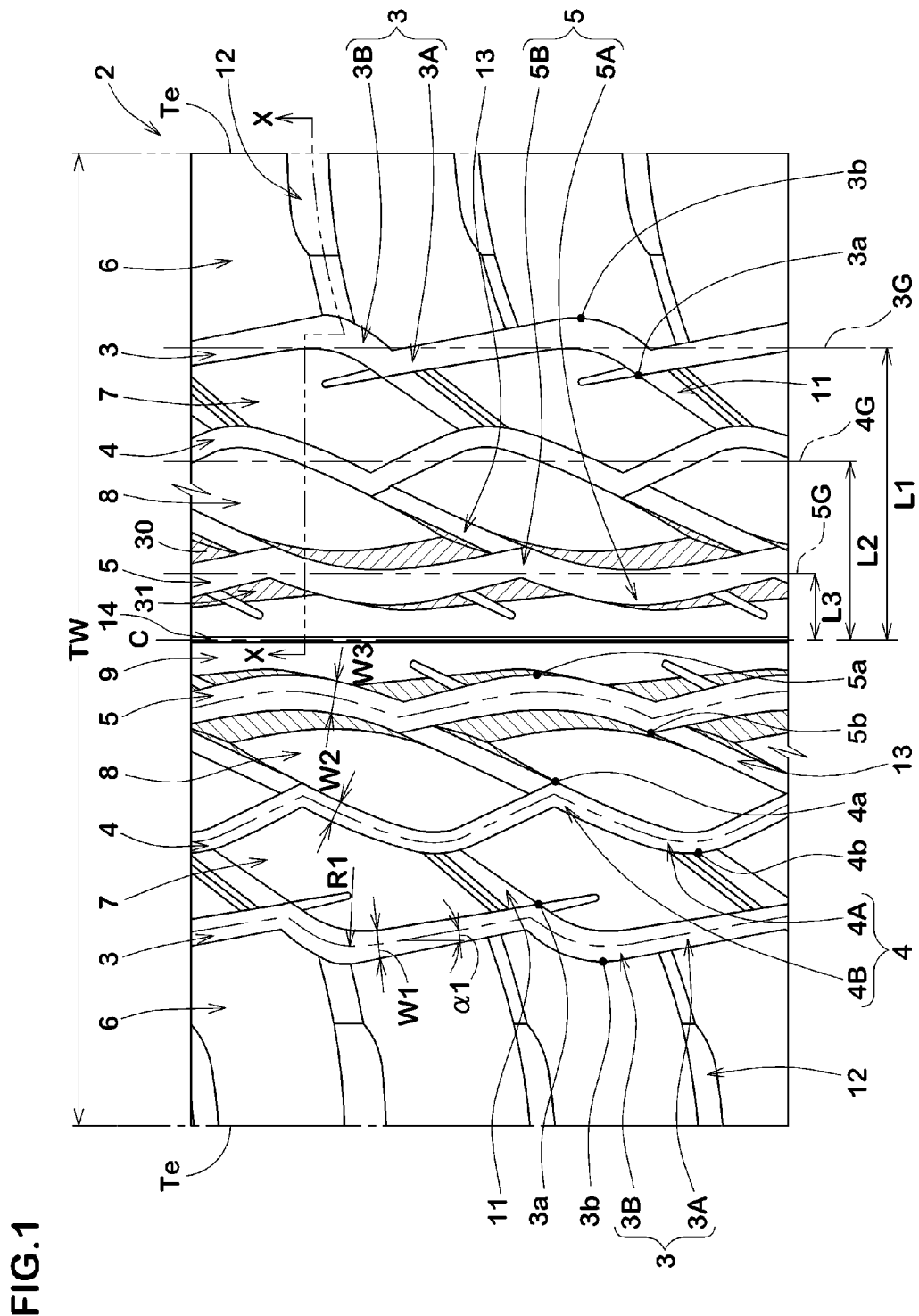
FIG. 1 is a development view illustrating a tread portion in accordance with an embodiment of the present invention.

As shown in FIG. 1, a pneumatic tire 1 in accordance with the present embodiment is illustrated as an all-season tire for four-wheel drive vehicles. The tire 1 includes a tread portion 2 provided with a plurality of circumferentially and continuously extending main grooves. In this embodiment, the main grooves include a pair of shoulder grooves 3 and 3 each disposed on the nearest side of a tread edge Te, a pair of middle main grooves 4 and 4 each disposed axially inward of the shoulder main groove 3, and a pair of crown main grooves 5 and 5 each disposed axially inward of the middle main grooves 4. Thus, the tread portion 2 is divided into a plurality of land portions that include a pair of shoulder portions 6 each arranged between the shoulder main groove 3 and the tread edge Te on both sides of a tire equator C, a pair of outer-middle portions 7 each arranged between the shoulder main groove 3 and the middle main groove 4 on both sides of the tire equator C, a pair of inner-middle portions 8 each arranged between the middle main groove 4 and the crown main groove 5 on both sides of the tire equator C, and a crown portion 9 arranged between the crown main grooves 5 and 5.

Here, the tread edges Te are the axial outermost edges of the ground contacting patch of the tire, which occurs under a normally inflated loaded condition. The normally inflated loaded condition is such that the tire is mounted on a standard wheel rim with a camber angle of zero and inflated to a standard pressure and loaded with a standard tire load.

The standard wheel rim means a wheel rim officially approved or recommended for the tire by standards organizations, and the standard wheel rim is the "standard rim" specified in JATMA, the "Measuring Rim" in ETRTO, and the "Design Rim" in TRA or the like, for example.

The standard pressure means the "maximum air pressure" in JATMA, the "Inflation Pressure" in ETRTO, and the maximum pressure given in the "Tire Load Limits at Various Cold Inflation Pressures" table in TRA or the like.

The standard tire load is the "maximum load capacity" in JATMA, the "Load Capacity" in ETRTO, and the maximum value given in the above-mentioned table in TRA or the like.

In case of passenger car tires, however, the standard pressure and standard tire load are uniformly defined by 180 kPa and 88% of the maximum tire load, respectively.

A tread width TW is defined as an axial width between the tread edges Te and Te under a normally inflated unloaded condition such that the tire is mounted on the standard wheel rim and inflate to the standard pressure but loaded with no tire load.

In this application including specification and claims, various dimensions, positions and the like of the tire refer to those under the normally inflated unloaded condition of the tire unless otherwise noted.

The shoulder main groove 3 extends in a zigzag manner having an axial amplitude between its axially innermost peak 3a and its axially outermost peak 3b. Thus, since the shoulder main groove 3 includes an axial groove component, it shears compressed snow therein between the tread portion 2 and a snow road during traveling so that snow traction is enhanced. Each of the peaks 3a and 3b is defined as a point on the groove edge of the shoulder main groove 3. When it is difficult to identify a part of the groove edge due to another groove being connected thereto, the peaks 3a and 3b may be defined using an imaginary groove edge that smoothly complements its groove edge.

The shoulder main groove 3 includes a straightly extending inclined portion 3A and a curved portion 3B, which are alternately arranged in a circumferential direction of the tire. In this embodiment, the inclined portion 3A is inclined at angle α1 with respect to the circumferential direction of the tire to enhance snow traction. In order to further enhance snow traction while maintaining rigidity of the shoulder and middle portion 6 and 7, the angle α1 of the inclined portion 3A is preferably set in a range of from 5 to 15 degrees.

The curved portion 3B extends in an arc manner that protrudes axially outward of the tire to have the axially outermost peak 3b thereof. The curved portion 3B includes one end that is smoothly communicated with the inclined portion 3A, and the other end that is communicated with the inclined portion 3A while inclining opposite direction with respect to the inclined portion 3A to form a sharpened corner with the axially innermost peak 3a. Such a curved portion 3B may disturb the vibration of the air flowing through the shoulder main groove 3, thereby improving noise performance of the tire.

In order to further improve the advantage described above, the radius of curvature R1 of the curved portion 3B is preferably set in a range of from 15 to 35 mm. When the radius of curvature R1 of the curved portion 3B is less than 15 mm, the rigidity of the shoulder and middle portions 6 and 7 might be decreased. When the radius of curvature R1 of the curved portion 3B is mores than 35 mm, it might be difficult to disturb the vibration of the air flowing through the shoulder main groove 3.

Figure 3:
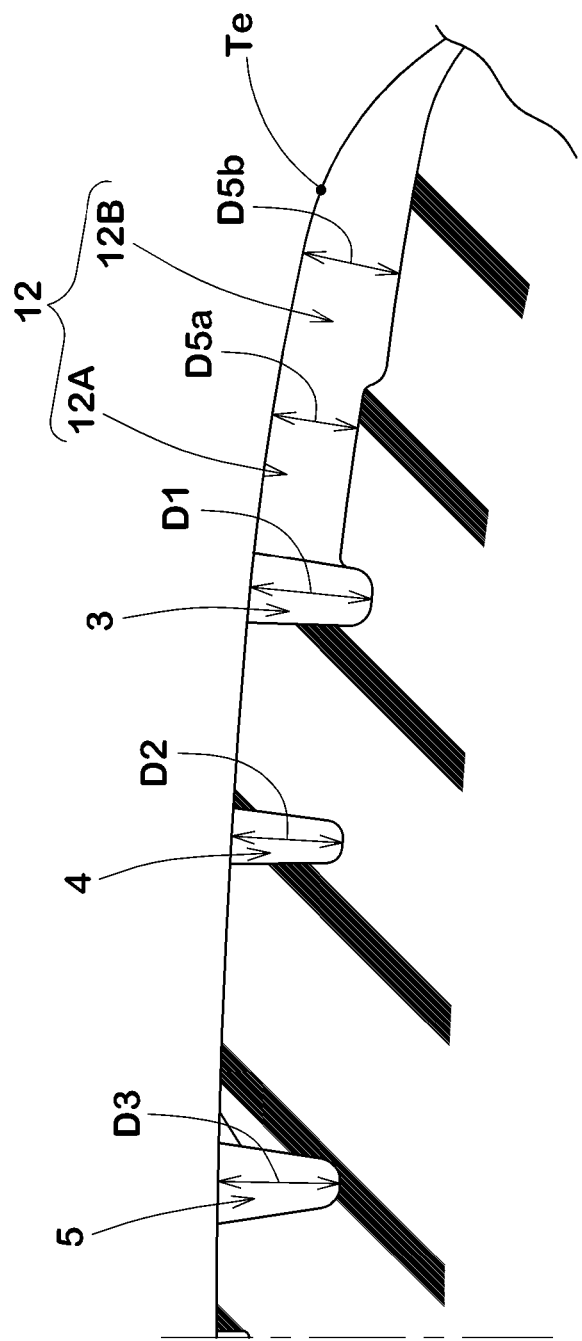
FIG. 3 is a cross-sectional view taken along a line X-X of FIG. 1.

The shoulder main groove 3 preferably has a groove width W1 in a range of from 1.0% to 4.0% of the tread width TW to further improve noise performance and snow traction. Similarly, the shoulder main groove 3 has a groove depth D1 (shown in FIG. 3) in a range of from 9.0 to 13.0 mm.

The shoulder main groove 3 is preferably arranged its groove centerline 3G away from the tire equator C at an axial length L1 of from 25% to 35% of the tread width TW.

The middle main groove 4 extends in a zigzag manner having an axial amplitude between its axially innermost peak 4a and its axially outermost peak 4b. The middle main groove 4 includes a plurality of outer curved portions 4A each of which is smoothly curved and protrudes axially outward, and a plurality of inner curved portions 4B each of which is sharply bent and protrudes axially inward. Theses outer curved portions 4A and inner curved portions 4B are arranged alternately in the circumferential direction of the tire.

In order to further improve noise performance and snow traction, the middle main groove 4 preferably has its groove width W2 in a range of from 0.5% to 3.5% of the tread width TW, and its groove depth D2 (shown in FIG. 3) in a range of from 8.0 to 12.0 mm.

The middle main groove 4 preferably has its groove centerline 4G away from the tire equator C at an axial length L2 of from 14% to 22% of the tread width TW.

Figure 2:
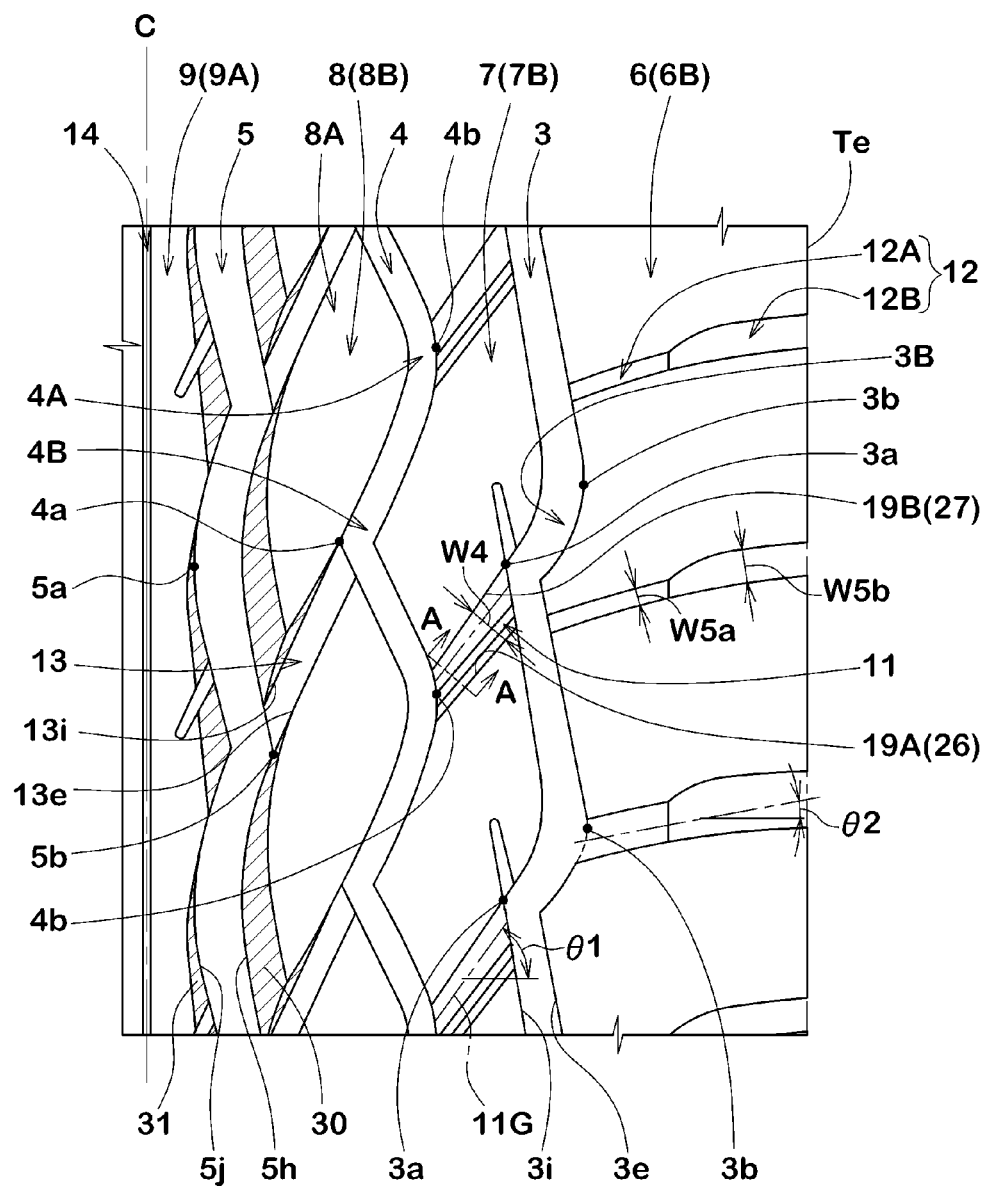
FIG. 2 is an enlarged view of the right side of FIG. 1.

The crown main groove 5 extends in a zigzag manner having an axial amplitude between its axially innermost peak 5a and its axially outermost peak 5b. In this embodiment, since a chamfered portion 30 or 31 is provided on a respective corner formed between a groove wall of the crown main groove 5 and a ground contacting surface of the tread portion 2, the axially innermost peak 5a and outermost peak 5b are defined using its imaginary groove edge defined without taking into the chamfered portions 30 and 31. In FIGS. 1 and 2, the chamfered portion 30 and 31 are marked by hatching.

The crown main groove 5 includes a plurality of inner curved portions 5A each of which is smoothly curved and protrudes axially inward, and a plurality of outer curved portions 5B each of which is sharply bent and protrudes axially outward, which are alternately arranged in the circumferential direction of the tire. In order to further improve noise performance and snow traction, the crown main groove 5 preferably has its groove width W3 in a range of from 1.5% to 5.0% of the tread width TW, and its groove depth D3 (shown in FIG. 3) in a range of from 9.0 to 13.0 mm. In this embodiment, the groove width W3 of the crown main groove 5 is measured between its imaginary groove edges defined without taking into the chamfered portions 30 and 31.

The crown main groove 5 preferably has its groove centerline 5G away from the tire equator C at an axial length L3 of from 3% to 10% of the tread width TW.

Thus, since each of the middle main groove 4 and crown main groove 5 also includes an axial groove component, it may further enhance snow traction of the tire.

FIG. 2 illustrates an enlarged view of the right side of the tread portion in FIG. 1. As shown in FIG. 2, the outer-middle portion 7 is provided with a plurality of middle lateral grooves 11 extending axially inward from the shoulder main groove 3. In this embodiment, each middle lateral groove 11 extends to the middle main groove 4 from the shoulder main groove 3 to form a plurality of outer-middle blocks 7B therebetween.

Figure 4:
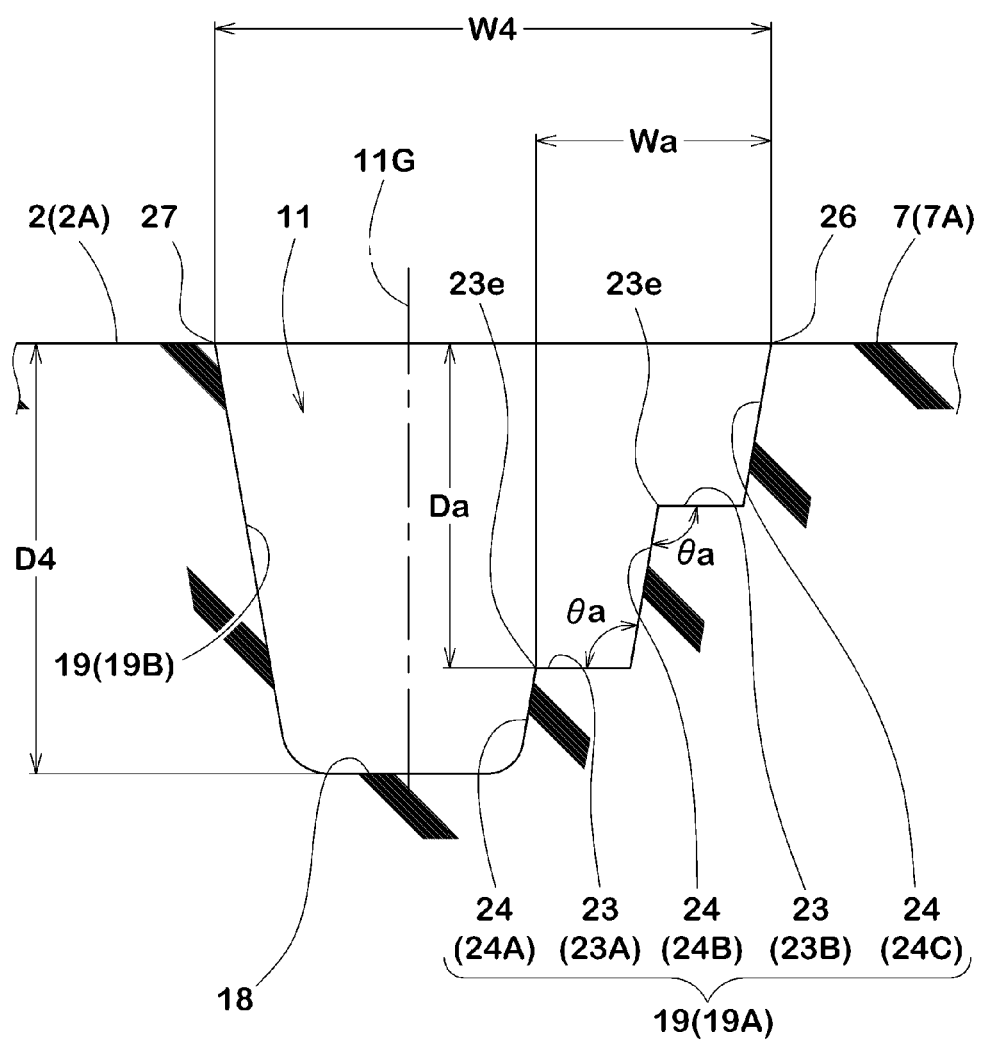
FIG. 4 is a cross-sectional view of a middle lateral groove.

FIG. 4 illustrates a cross-sectional view of the middle lateral groove 11 taken along a line A-A of FIG. 2. As shown in FIG. 4, the middle lateral groove 11 includes a bottom 18, and a pair of groove walls 19 each extending radially outward from the bottom 18 to the ground contacting surface 2A of the tread portion 2, more specifically to the ground contacting surface 7A of the outer-middle portion 7.

The groove walls 19 include a first groove wall 19A being formed as a stepwise (shown the right in FIG. 4) extending from the bottom 18 to a first groove edge 26, and a second groove wall 19B being formed as a non-stepwise groove wall (shown the left in FIG. 4) extending from the bottom 18 to a second groove edge 27.

The first groove wall 19A formed as the stepwise in accordance with the present embodiment includes a plurality of level parts 23, and a plurality of riser parts 24, which are alternately arranged.

The level part 23 extends substantially parallel with the ground contacting surface 7A of the outer-middle portion 7. Preferably, the level part 23 may have an angle of not more than 10 degrees with respect to the ground contacting surface 7A of the outer-middle portion 7. Thus, the middle lateral groove 11 may have a larger groove volume for enhancing snow traction. Preferably, a sharp edge 23e that may enhance snow traction is formed on a corner between the level part 23 and the riser 24. Furthermore, due to a large surface-area of the stepwise groove wall, a first groove wall 19A may disturb the air flow coming from the shoulder main groove 3 and/or the middle main groove 4 therein so that the resonance noise of the tire may efficiently be reduced.

In order to further enhance snow traction by offering large friction force using the sharp edge 23A, the first groove wall 19A formed as the stepwise includes a number of the level part 23 in a range of from 1 to 3. Preferably, the first groove wall 19A formed as the stepwise includes two level parts 23 that include a first level part 23A disposed radially innermost of the first groove wall 19A, and a second level part 23B disposed radially outward of the first level part 23A.

The riser parts 24 in accordance with the present embodiment includes a first riser 24A disposed radially innermost of the first groove wall 19A, a third riser 24C disposed radially outermost of the first groove wall 19A, and a second riser 24B disposed therebetween.

The first groove wall 19A formed as the stepwise has a depth Da from the ground contacting surface 7A of the outer middle portion 7 to the first level part 23A being in a range of from 50% to 80% of a maximum groove depth D4 of the middle lateral groove 11. Thus, the snow traction of the tire may further be enhanced while improving noise performance. When the depth Da is less than 50% of the maximum groove depth D4 of the middle lateral groove 11, it might be difficult to enhance snow traction of the tire due to an insufficient groove volume. When the depth Da is more than 80% of the maximum groove depth D4 of the middle lateral groove 11, it might be difficult to improve noise performance of the tire due to excessively large groove volume. More preferably, the depth Da is set in a range of from 55% to 75% of the maximum groove depth D4 of the middle lateral groove 11.

To further enhance snow traction while improving noise performance, the first groove wall 19A preferably has a width Wa from the first level part 23A to a groove edge 26 thereof measured along a groove width direction being in a range of from 50% to 150%, more preferably in a range of from 60% to 140% of the depth Da.

The tire in accordance with the present embodiment may exhibit excellent noise performance and better traction on snow. To further improve noise performance by preventing leaking the noise from the main groove through the tread edge Te, the first groove wall 19B is preferably provided on the middle lateral groove like as the above mentioned embodiment, or the shoulder lateral groove 12 described later.

In order to further enhance snow traction, an angle θa between the level part 23 and the riser part 24 is preferably set in a range of from 90 to 120 degrees.

The second groove wall 19B is formed as a smoothly extending slant surface from the bottom 18 to the ground contacting surface 7A of the outer-middle portion 7.

As shown in FIG. 2, the middle lateral groove 11 is connected to the shoulder main groove 3 at the place where it includes the axially innermost peak 3a. Thus, the rigidity of the outer-middle portion 7 around the axially innermost peak 3a may be enhanced.

The second groove edge 27 of the second groove wall 19B is smoothly connected to an axially inner groove edge 3i of the shoulder main groove 3 so that the middle lateral groove 11 is smoothly communicated with the curved portion 3B of the shoulder main groove 3. The first groove edge 26 of the first lateral groove wall 19A is connected to the shoulder main groove 3 at a place axially outside of the axially innermost peak 3a. Since a continuous long void from the curved portion 3B to the middle lateral groove 11 may efficiently compress snow, snow traction may further be enhanced.

The middle lateral groove 11 in this embodiment is communicated with the middle main groove 4 at its axially outermost peak 4b of the outer curved portion 4A. Thus, since a further continuous long void from the curved portion 3B to the middle main groove 4 through the middle lateral groove 11 may efficiently compress snow, snow traction may further be enhanced.

Preferably, the middle lateral groove 11 has its angle θ1 in a range of from 15 to 60 degrees, more preferably in a range of from 20 to 55 degrees with respect to the axial direction of the tire to further enhance snow traction while improving noise performance of the tire. Here, the angle θ1 is an angle measured using its centerline 11G of the bottom 18 (shown in FIG. 4).

Preferably, the middle lateral groove 11 has its groove width W4 in a range of from 1.5% to 5.0% of the tread width TW, and its maximum groove depth D4 in a range of from 60% to 80% of the depth D1 of the shoulder main groove 3 (shown in FIG. 3), to further enhance snow traction while improving noise performance of the tire. Here, the groove width W4 is a width measured perpendicular to the centerline 11G.

The shoulder lateral groove 12 includes an axially inner portion 12A with a groove width W5a extending from the shoulder main groove 3, and an axially outer portion 12b having a groove width W5b larger than the groove width W5a. The axially inner portion 12A may prevent leaking the noise generated from the shoulder main groove 3. Furthermore, the axially inner portion 12A of the shoulder lateral groove 12 may generate less air-pumping noise. In addition, the axially outer portion 12B of the shoulder lateral groove 12 may enhance snow traction.

Preferably, the shoulder lateral groove 12 has its angle θ2 with respect to the axial direction of the tire, which is smaller than the angle θ1 of the middle lateral groove 11 to enhance snow traction during cornering. To further improve noise performance of the tire, the angle θ2 of the shoulder lateral groove 12 may be preferably set in a range of from 5 to 45 degrees. Here, the angle θ2 is defined using a straight line that passes between an axially innermost center point of the groove width and an axially outermost center point of the groove width.

Preferably, the axially inner portion 12A may have the groove width W5a in a range of from 0.30 to 0.95 times the groove width W1 (shown in FIG. 1) of the shoulder main groove 3, and have its groove depth D5a (shown in FIG. 3) in a range of from 0.6 to 0.8 times the groove depth D1 of the shoulder main groove 3. Preferably, the axially outer portion 12B may have the groove width W5b in a range of from 1.3 to 2.0 times the groove width W5a of the axially inner portion 12A, and have its groove depth D5b (shown in FIG. 3) in a range of from 1.1 to 1.3 times the groove depth D5a of the axially inner portion 12A. Thus, the tire may exhibit excellent steering stability and better snow traction.

The inner-middle portion 8 is provided with a plurality of inner-middle lateral grooves 13 extending from the middle main groove 4 to the crown main groove 5 to form a plurality of inner-middle blocks 8B.

In this embodiment, each inner-middle lateral groove 13 includes one groove edge 13i being continuously and smoothly connected to the axially inner groove edge of the middle main groove 4 at its axially innermost peak 4a. The inner-middle lateral groove 13 includes the other groove edge 13e being continuously and smoothly connected to the axially outer groove edge of the crown main groove 5 at its axially outermost peak 5b. Since a continuous long void for compressing and shearing snow may be offered using the inner-middle lateral groove 13, middle main groove 4, and crown main groove 5, snow traction may further be enhanced.

In this embodiment, the chamfered portion 30 is provided on a corner between the ground contacting surface 8A of the inner-middle portion 8 and the axially outer groove wall 5h of the crown main groove 5.

The crown portion 9 is provided with a circumferentially and straightly extending crown narrow groove 14 on the tire equator C. Thus, the crown portion 9 is divided into a pair of ribs. Furthermore, the chamfered portion 31 is provided on a corner between the ground contacting surface 9A of the crown portion 9 and the axially inner groove wall 5j of the crown main groove 5.

Figure 5:
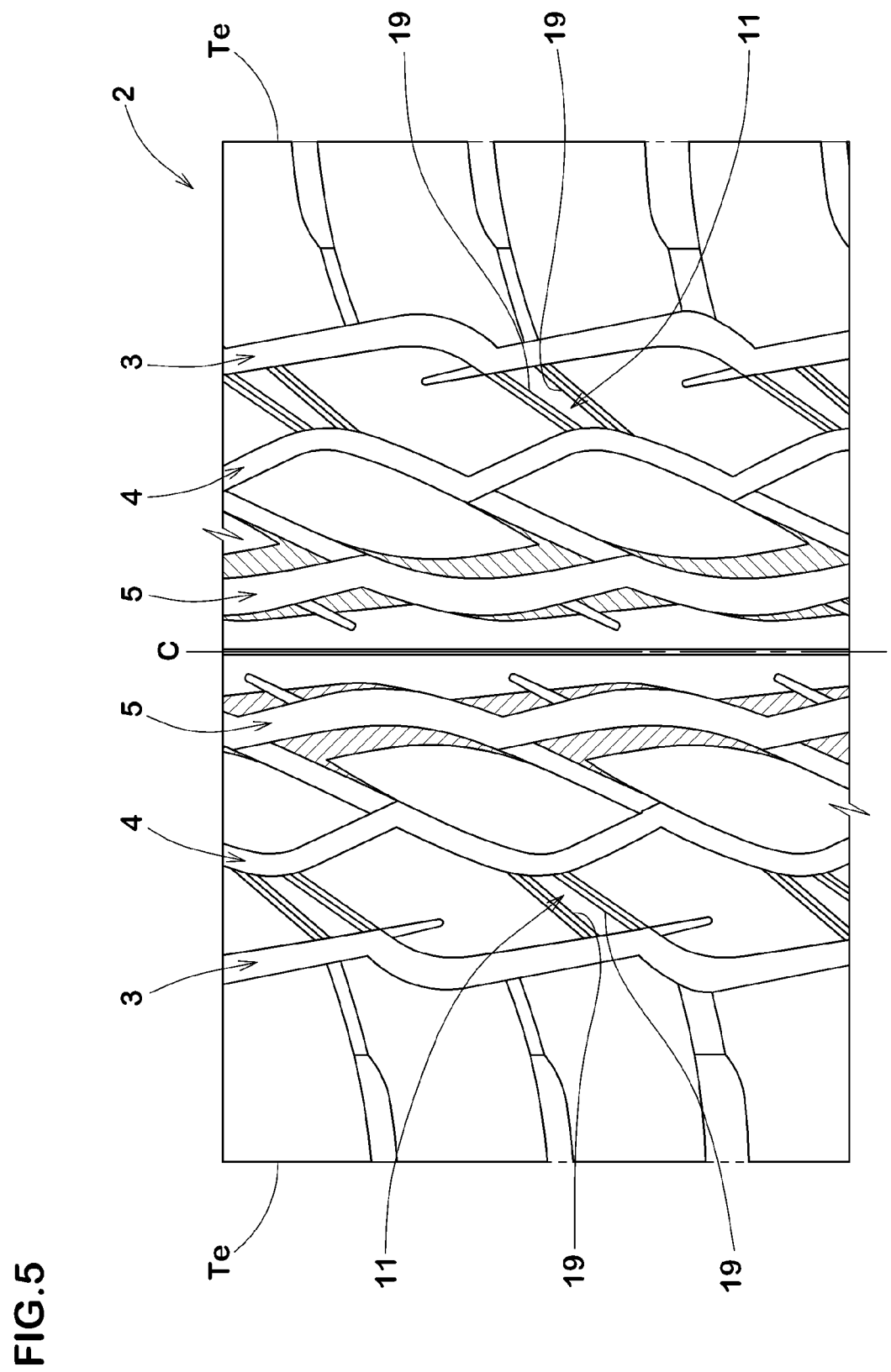
FIG. 5 is a development view illustrating a tread portion in accordance with another embodiment of the present invention.

FIG. 5 is a development view illustrating a tread portion in accordance with another embodiment of the present invention. As shown in FIG. 5, the middle lateral groove 11 includes a pair of groove walls 19 and 19 each of which is formed as the stepwise groove wall described above to further enhance snow traction. The tire shown in FIG. 5 may exhibit better snow traction regardless of its rotational direction while improving noise performance.

Figure 6:
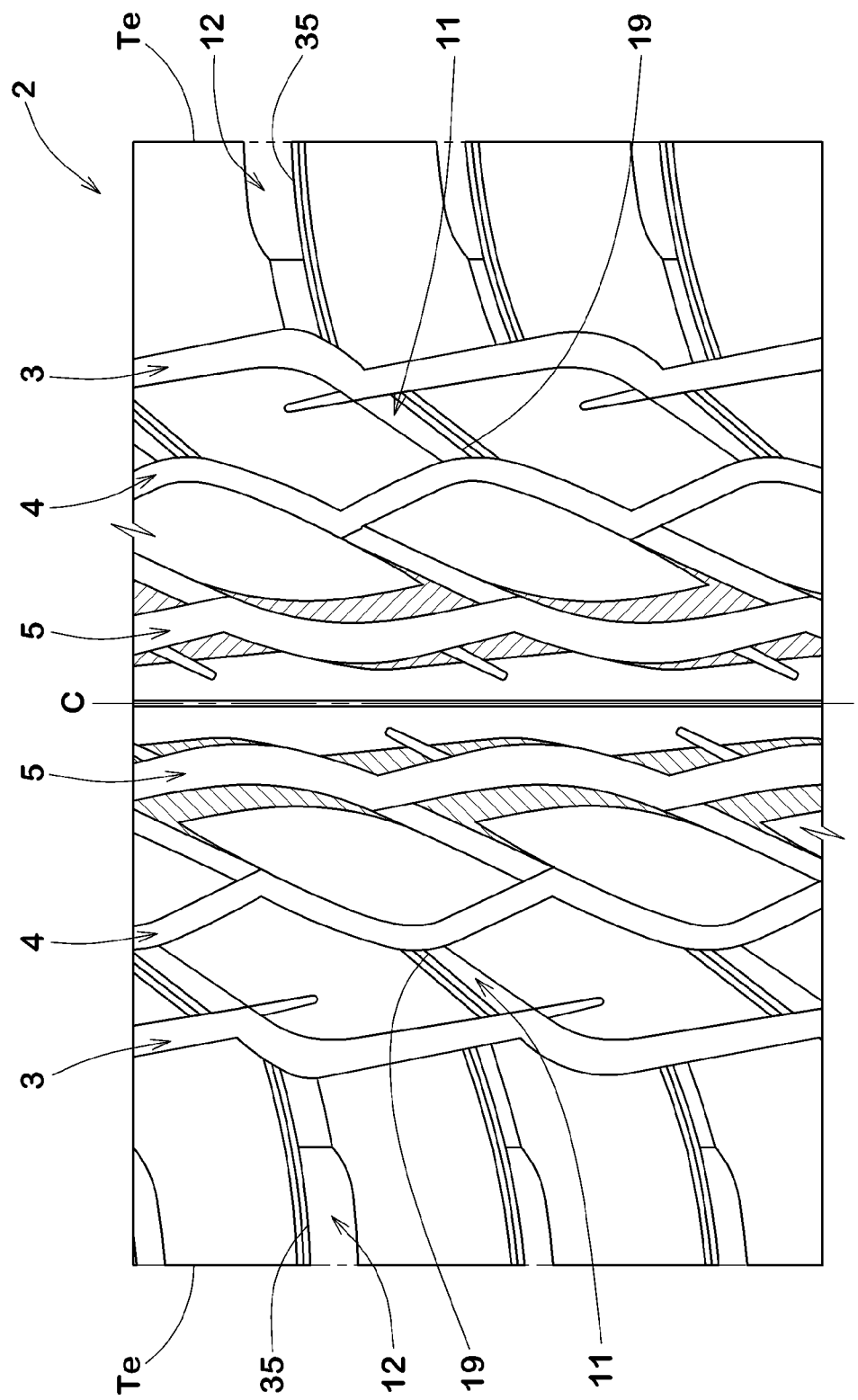
FIG. 6 is a development view illustrating a tread portion of a pneumatic tire in accordance with another embodiment of the present invention.

FIG. 6 is a development view illustrating a tread portion in accordance with another embodiment of the present invention. As shown in FIG. 6, the respective middle lateral groove 11 and the shoulder lateral groove 12 include at least one groove walls 19 being formed as the stepwise groove wall described above to further enhance snow traction. In another aspect of the present embodiment, the stepwise groove wall may be provided on the shoulder lateral groove 12 only (not shown).

While the particularly preferable embodiments of the present invention have been described in detail, the present invention is not limited to the illustrated embodiments, but can be modified and carried out in various aspects.

Comparison Test

Pneumatic tires each having a size of 275/55R20 with a basic tread pattern of FIG. 1 except for the detail shown in Table 1 were made and tested. The major specifications of the tires and test methods are as follows.

Tread width TW: 208 mm
Shoulder main groove depth D1: 11.3 mm
Middle main groove depth D2: 10.3 mm
Crown main groove depth D3: 11.3 mm
Middle lateral groove maximum depth D4: 8.0 mm
Shoulder lateral groove maximum depth D5: 8.0 to 9.8 mm
Inner-middle lateral groove maximum depth: 5.1 to 8.4 mm
Crown narrow groove depth: 3.0 mm Steering Stability and Noise Performance Test:

Each test tire mounted on a rim of 20×9J with an internal pressure of 240 kPa was installed in a test vehicle having a displacement of 4,800 cc as its all wheels. Then, a test driver drove the test vehicle on an asphalt road, and then evaluated the steering stability, such as the steering response during cornering, stiffness and cornering grip and noise performance such as the air-pumping noise and pipe resonance noise by his feeling. The respective results are indicated in Table 1 by scores based on Ref. 1 being 100, wherein the larger the value, the better the performance is.

Snow Traction Test:

The test driver drove the test vehicle on a snowy road, and then evaluated the degree of snow traction when starting and accelerating by his feeling. The results are indicated in Table 1 by a score based on Ref 1 being 100. The larger the score, the better the performance is.

Test results are shown in Table 1. From the test results, it was confirmed that Example tires in accordance with the present embodiment can be efficiently enhanced snow traction while improving noise performance.

TABLE 1

Figure 7:
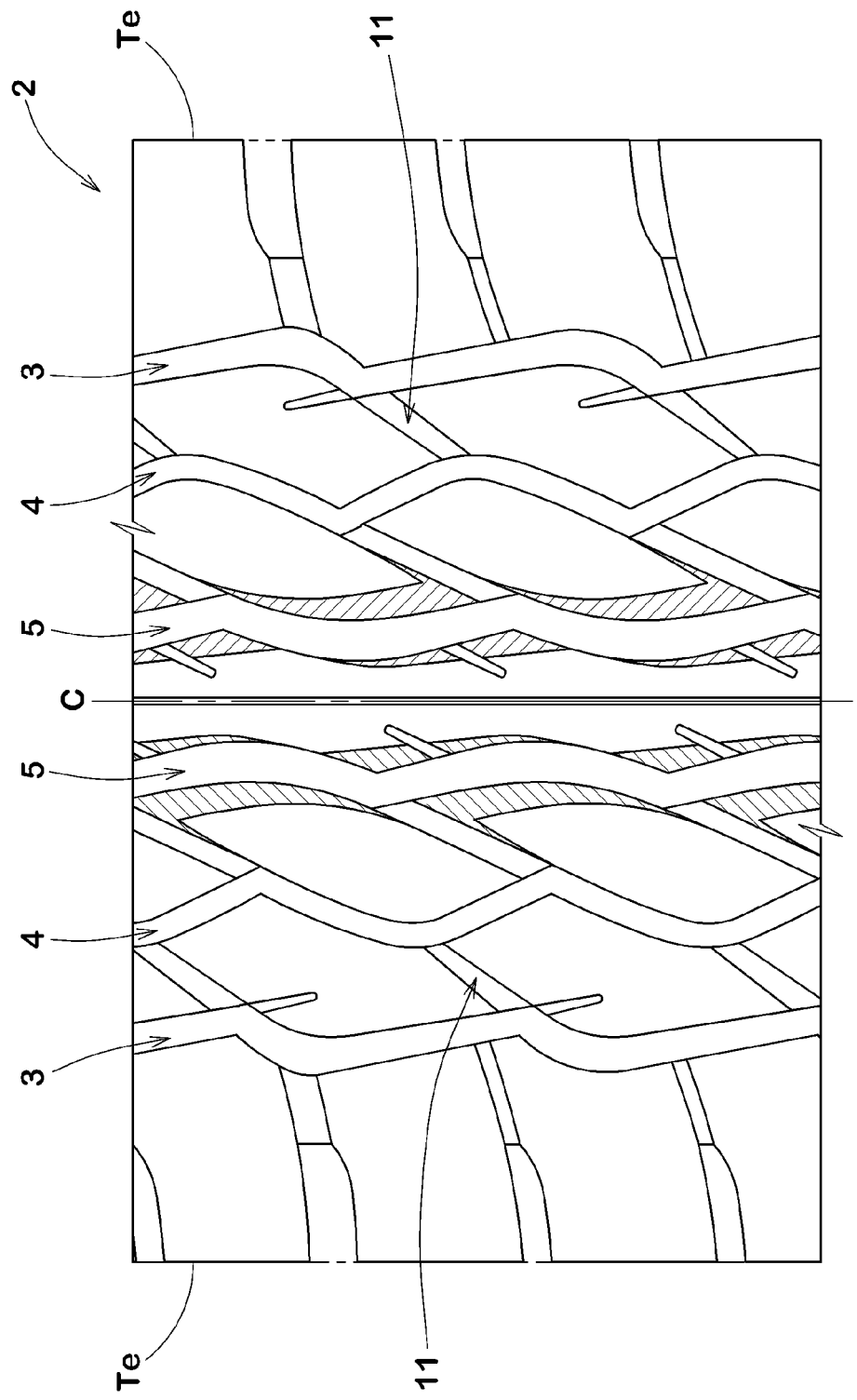
FIG. 7 is a development view illustrating a tread portion of a comparative example of the present invention.

|  | Ref. 1 | Ex. 1 | Ref. 2 | Ref. 3 | Ex. 2 | Ex. 3 | Ref. 4 | Ref. 5 | Ex. 4 |
|---|---|---|---|---|---|---|---|---|---|
| Tread pattern | FIG. 7 | FIG. 1 | FIG. 1 | FIG. 1 | FIG. 1 | FIG. 1 | FIG. 1 | FIG. 1 | FIG. 1 |
| Number of level parts on stepwise groove wall | 0 | 2 | 4 | 2 | 2 | 2 | 2 | 2 | 2 |
| Ratio Da/D4 (%) | — | 75 | 75 | 40 | 50 | 80 | 90 | 75 | 75 |
| Ratio Wa/Da (%) | — | 80 | 80 | 80 | 80 | 80 | 80 | 40 | 50 |
| Middle lateral groove angle θ1 (deg.) | 50 | 50 | 50 | 50 | 50 | 50 | 50 | 50 | 50 |
| Snow traction [Score] | 100 | 120 | 105 | 102 | 115 | 123 | 125 | 104 | 115 |
| Noise performance [Score] | 100 | 98 | 97 | 102 | 100 | 96 | 90 | 103 | 100 |
| Steering stability [Score] | 100 | 97 | 98 | 101 | 98 | 95 | 90 | 98 | 97 |

|  | Ex. 5 | Ref. 6 | Ex. 6 | Ex. 7 | Ex. 8 | Ex. 9 | Ex. 10 | Ex. 11 |
|---|---|---|---|---|---|---|---|---|
| Tread pattern | FIG. 1 | FIG. 1 | FIG. 1 | FIG. 1 | FIG. 1 | FIG. 1 | FIG. 5 | FIG. 6 |
| Number of level parts on stepwise groove wall | 2 | 2 | 2 | 2 | 2 | 2 | 2 | 2 |
| Ratio Da/D4 (%) | 75 | 75 | 75 | 75 | 75 | 75 | 75 | 75 |
| Ratio Wa/Da (%) | 150 | 160 | 80 | 80 | 80 | 80 | 80 | 80 |
| Middle lateral groove angle θ1 (deg.) | 50 | 50 | 0 | 15 | 60 | 80 | 50 | 50 |
| Snow traction [Score] | 120 | 125 | 123 | 121 | 114 | 110 | 123 | 125 |
| Noise performance [Score] | 96 | 90 | 92 | 96 | 102 | 103 | 96 | 96 |
| Steering stability [Score] | 95 | 90 | 96 | 97 | 98 | 99 | 96 | 96 |

What is claimed is:

1. A pneumatic tire comprising:

a tread portion provided with a shoulder main groove arranged in a nearest side of a tread edge and a middle lateral groove that extends axially inward from the shoulder main groove;

the shoulder main groove extending in a zigzag manner having an axial amplitude between an axially innermost peak and an axially outermost peak, the shoulder main groove comprising a straightly extending inclined portion and a curved portion extending in an arc manner having a center of curvature located axially inward of the shoulder main groove, the inclined portion and the curved portion alternately arranged in a circumferential direction of the tire;

the middle lateral groove comprising a first groove wall having a first groove edge and a second groove wall having a second groove edge;

the first groove wall being formed as a stepwise groove wall comprising at least one, and not more than three level parts;

in a cross-sectional view of the middle lateral groove, a depth Da from a ground contacting surface of the tread portion to a radially innermost level part being in a range of from 50% to 80% in relation to a maximum groove depth D4 of the middle lateral groove, a width Wa from the radially innermost level part to a groove edge of the stepwise groove wall measured along a groove width direction being in a range of from 80% to 150% in relation to the depth Da; and the second groove wall being formed as a non-stepwise groove wall, the second groove edge of the second groove wall connected to the axially innermost peak of the shoulder main groove so that the second groove edge is smoothly continuous to an axially inner edge of the curved portion.

2. The pneumatic tire according to claim 1, wherein the middle lateral groove is inclined at an angle in a range of from 15 to 60 degrees with respect to an axial direction of the tire.

3. The pneumatic tire according to claim 1, wherein the stepwise groove wall comprises two level parts.

4. The pneumatic tire according to claim 1, the stepwise groove wall further comprising a plurality of riser parts and a sharp edge formed on a corner between one level part and one riser part.

5. The pneumatic tire according to claim 3, the stepwise groove wall further comprising three riser parts and two sharp edges each of which is formed on a corner between one level part and one riser part.

* * * * *